United States Patent
Maybury

(10) Patent No.: US 6,952,943 B2
(45) Date of Patent: Oct. 11, 2005

(54) METHOD AND MACHINE OF MANUFACTURE OF ROTOR ELEMENTS

(75) Inventor: Peter Maybury, Kingswinford (GB)

(73) Assignee: European Electrical Laminations Limited (GB)

( * ) Notice: Subject to any disclaimer, the term of this patent is extended or adjusted under 35 U.S.C. 154(b) by 161 days.

(21) Appl. No.: 10/257,816

(22) PCT Filed: Mar. 20, 2001

(86) PCT No.: PCT/GB01/01220

§ 371 (c)(1),
(2), (4) Date: Feb. 12, 2003

(87) PCT Pub. No.: WO01/80401

PCT Pub. Date: Oct. 25, 2001

(65) Prior Publication Data

US 2004/0100158 A1 May 27, 2004

(30) Foreign Application Priority Data

Apr. 15, 2000 (EP) .............................................. 0009248

(51) Int. Cl.⁷ ............................................. B21D 28/02
(52) U.S. Cl. ............................. 72/337; 72/339; 72/448; 29/596; 83/699.41
(58) Field of Search .......................... 72/337, 339, 448; 29/596; 83/43, 46, 699.41, 699.31

(56) References Cited

U.S. PATENT DOCUMENTS 4,418,471 A * 12/1983 Torii et al. .................... 29/596
4,616,151 A    10/1986 Pryjmak
4,899,569 A *  2/1990 Matsushita et al. ........... 72/336
5,982,055 A    11/1999 Matsushita et al. ... 310/40 MM
6,484,387 B1   11/2002 Lee et al. ..................... 29/596

FOREIGN PATENT DOCUMENTS

| DE | 41 14 989 A | 11/1992 |
| EP | 0 711 021 A | 5/1996 |
| JP | 55061260 A | 5/1980 |
| JP | 08294242 A | 11/1996 |

* cited by examiner

Primary Examiner—Daniel C. Crane
(74) Attorney, Agent, or Firm—MacMillan, Sobanski & Todd, LLC

(57) ABSTRACT

A rotor assembly for an electric motor comprising rotor elements each having a body portion and pole portions formed integrally as a pressing from strip steel, Each successively formed rotor element is formed with its pole portions offset relative to its body portion by an amount different from the offset on the previously formed rotor element. The rotor elements are produces by the use of a progressive die assembly to punch the rotor elements from strip material. At least part of the pole portion of the rotor element is produced by a first die member, and at least a part of the body portion is produced by a second die member. Relative movement is effected between the first and second die members between successive punching operations to change the pole portion offset.

17 Claims, 6 Drawing Sheets

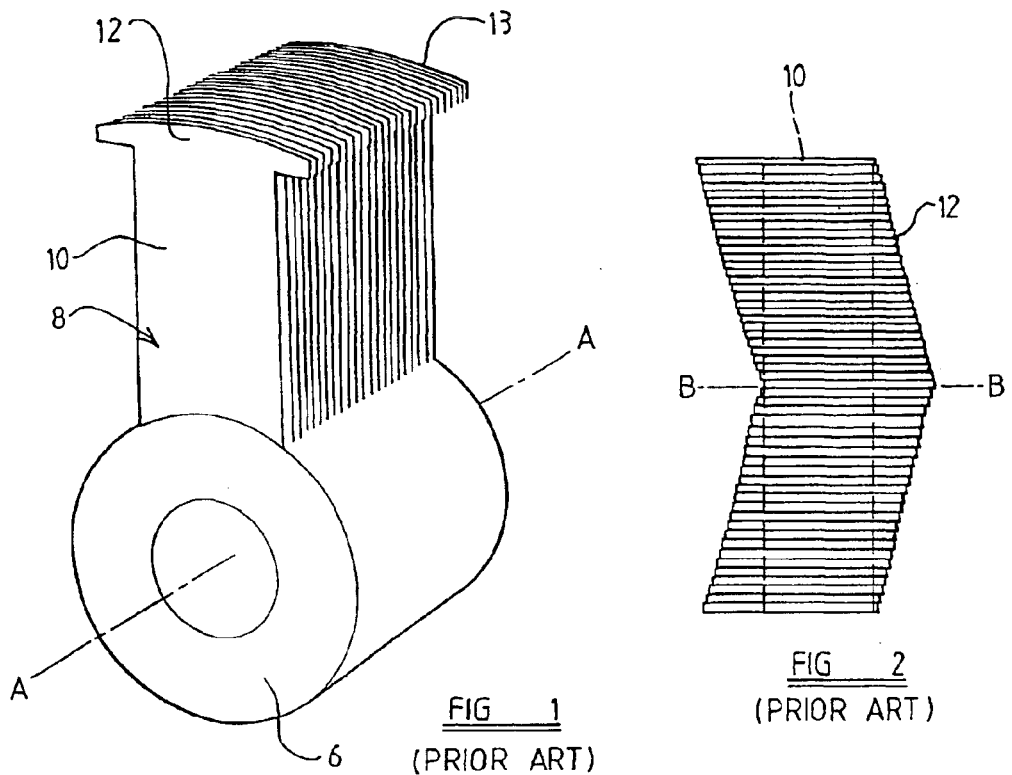
FIG 1 (PRIOR ART)
FIG 2 (PRIOR ART)
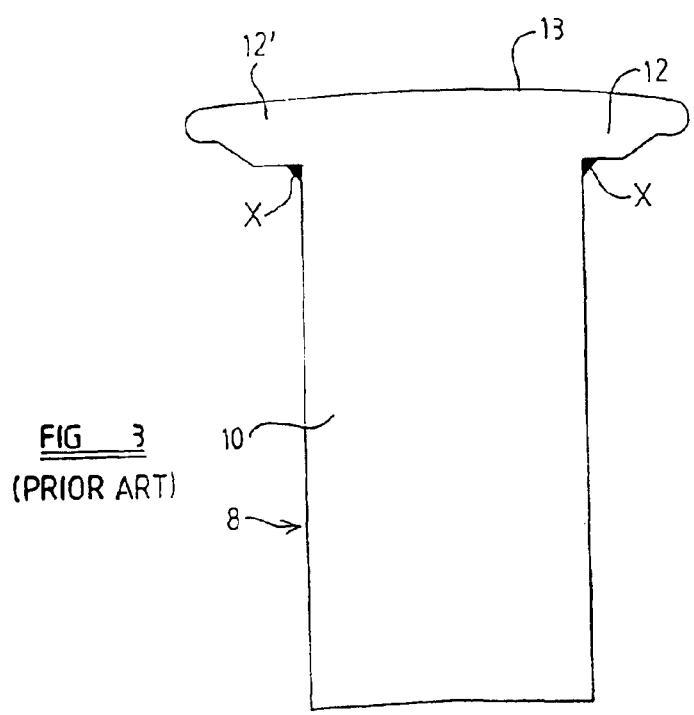
FIG 3 (PRIOR ART)

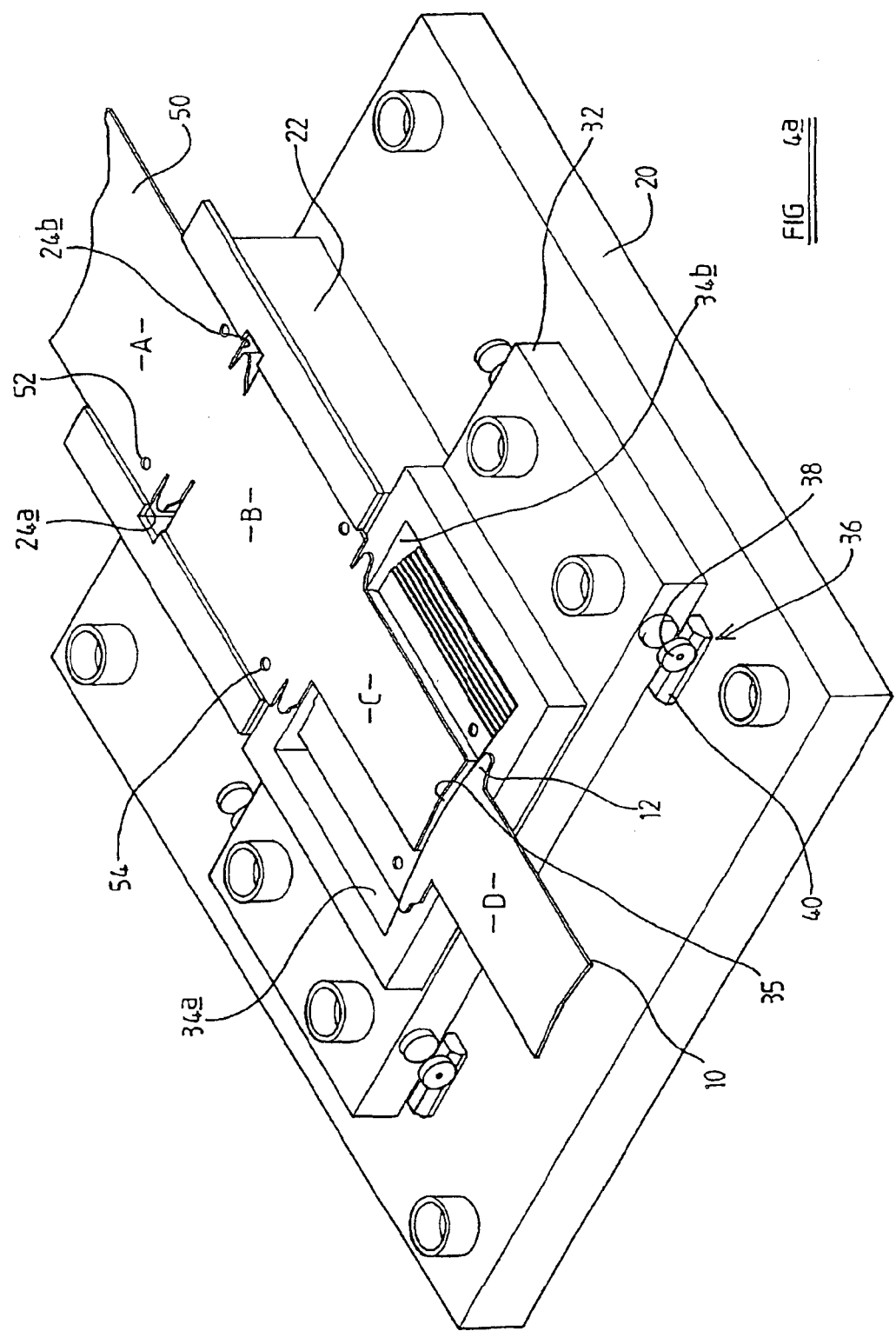

METHOD AND MACHINE OF MANUFACTURE OF ROTOR ELEMENTS

This application is a 371 of PCT/GB01/01220, filed Mar. 20, 2001.

DESCRIPTION OF INVENTION

This invention is concerned with improvements relating to electric motors, which term is to be deemed to include generators, and is particularly concerned with motors of the type comprising a fixed stator defining a generally hollow cylindrical chamber, and a rotor assembly comprising a shaft, adapted to be mounted within the stator, and a plurality of rotor members extending radially of the shaft. Such an electric motor is hereinafter referred to as being of the kind specified.

A conventional rotor member for a motor of the kind specified is constructed from a plurality of rotor elements, conveniently in the form of steel pressings, conventionally of about 1 mm in thickness which lie in or parallel to a plane extending at right angles to the axis of the rotor.

Conventionally each rotor element comprises a body portion, and positioned radially outwardly of the body portion, a pole portion having an extended outer surface which has a radius of curvature marginally smaller than that of the stator surface, there being a small air gap between the outer surface of the pole portion and the inner surface of the stator.

Conveniently, each rotor element is formed integrally as a pressing from (for example) a steel strip, the rotor being assembled by a jig in which the rotor elements are secured together in a desired orientation.

It is believed that there may be advantages by offsetting the pole portions in a manner such as to present, in plan view, the appearance of a chevron. However, since with such a construction adjacent pole portions have different positions in relation to the body portion dependant upon the position of the rotor element in a direction longitudinally of the shaft, it is not possible to produce such a rotor by stacking a number of identical elements, and to achieve this desired chevron design, it has been found necessary to produce, conveniently by stamping, pole plates separately from the body plates, and to secure these together by welding.

Whilst this may be accomplished by welding the pole plates to the body plates individually, it has been found convenient to assemble the pole plates and body plates in appropriate jigs, and to secure the pole plates to the body plates by welding along an interface corner on each of two opposite sides.

Whilst this enables a rotor of the desired chevron profile to be produced relatively simply by the use of semi-automatic machinery, it is nonetheless relatively complicated, and does cause a reduction to the flow of flux to the pole portion.

Additionally, since identical pole plates are utilised, necessarily the centres of curvature of the outer faces of the pole plates when assembled follow the line of the chevron, rather than, as occurs with the conventional design, having the centres of curvature lying in a radial plane of the rotor, and even though the effect of this is small, it produces a variation in the air gap at the centre, compared with the air gap at the sides of the rotor.

According to this invention there is provided a rotor for an electric motor of the kind specified, wherein the rotor elements are formed as integral pressings, whereof adjacent rotor elements comprise pole portions which are mutually offset.

According to this invention there is also provided a rotor assembly comprising a shaft, adapted to be mounted within a stator, and a plurality of rotor members extending radially of the shaft, each rotor member comprising a plurality of rotor elements each comprising a body portion and a pole portion integral with the body portion, wherein the pole portions of adjacent rotor elements are offset.

Conveniently, each rotor element is formed as pressing, such as from steel strip or plate, in which the pole portion of each rotor element is offset in a transverse, preferably circumferential direction from the body portion by a distance which varies in a direction parallel to the axis of the shaft.

In the direction of the shaft, said offset may vary from a maximum in one direction, diminishing through zero to a maximum in the opposite direction at a point generally centrally of the length of the shaft, and increasing through zero to a maximum again in said one direction.

Alternatively said offset may vary from zero to a maximum at a point generally centrally of the length of the shaft, returning again to zero.

According to this invention there is also provided a method of manufacture of rotor elements, involving the use of a die assembly to punch the rotor element from strip material, part at least of the pole portion of the rotor element being produced by a first die member and part at least of the body portion being produced by a second die member, characterised by the steps of effecting relative movement between the first and second die members between successive punching operations.

In this way rotor elements may be produced which have pole portions which are offset by different distances relative to a centre line of the body portion.

Preferably said method involves the steps of stamping a plurality of rotor elements, wherein an incremental adjustment of the position of the second die member relative to the first die member is produced after each punching operation.

Preferably the said part of the pole portion which is produced by the first die member is that part of the pole portion which is common to all rotor elements throughout the range.

Preferably said method involves the use a third die member adapted to punch strip material along a line defining the remainder of the pole portion.

Preferably said third die member moves in the performance of the method with the second die member.

Preferably the third die member defines a curved outer surface of the pole portion.

According to this invention there is also provided a machine for the manufacture of rotor elements, comprising a die assembly comprising a first die member for the punching part at least of the pole portion of the rotor element, and a second die member for the punching of a body portion of the rotor element, the first and second die members being mounted for relative movement to produce rotor elements the pole portions of which may be offset by different distances from a centre line of their associated body portions.

Each die member has associated therewith a punch, and preferably the assembly comprises a third die member adapted initially to produce a curved peripheral margin of the pole portions of the rotor elements.

Preferably the third die member simultaneously produces a curved peripheral margin of the body portions of the rotor elements.

Preferably the machine comprises means to cause all the die members thereof to perform a punching operation simultaneously.

The invention will now be described by way of example with reference to the accompanying drawings wherein:

FIG. 1 is a perspective view of a conventional rotor assembly;

FIG. 2 is a plan view of a modified form of rotor assembly of the kind shown in FIG. 1, of the known "chevron" design;

FIG. 3 is a side elevation of a rotor element utilised in the construction shown in FIG. 2;

FIGS. 4a, 5a and 6a are views of a machine utilised for the production of die elements in accordance with the present invention;

FIGS. 4b, 5b and 6b are views of rotor elements produced by the die assemblies shown in FIGS. 4a, 5a and 6a;

Figure 5A:
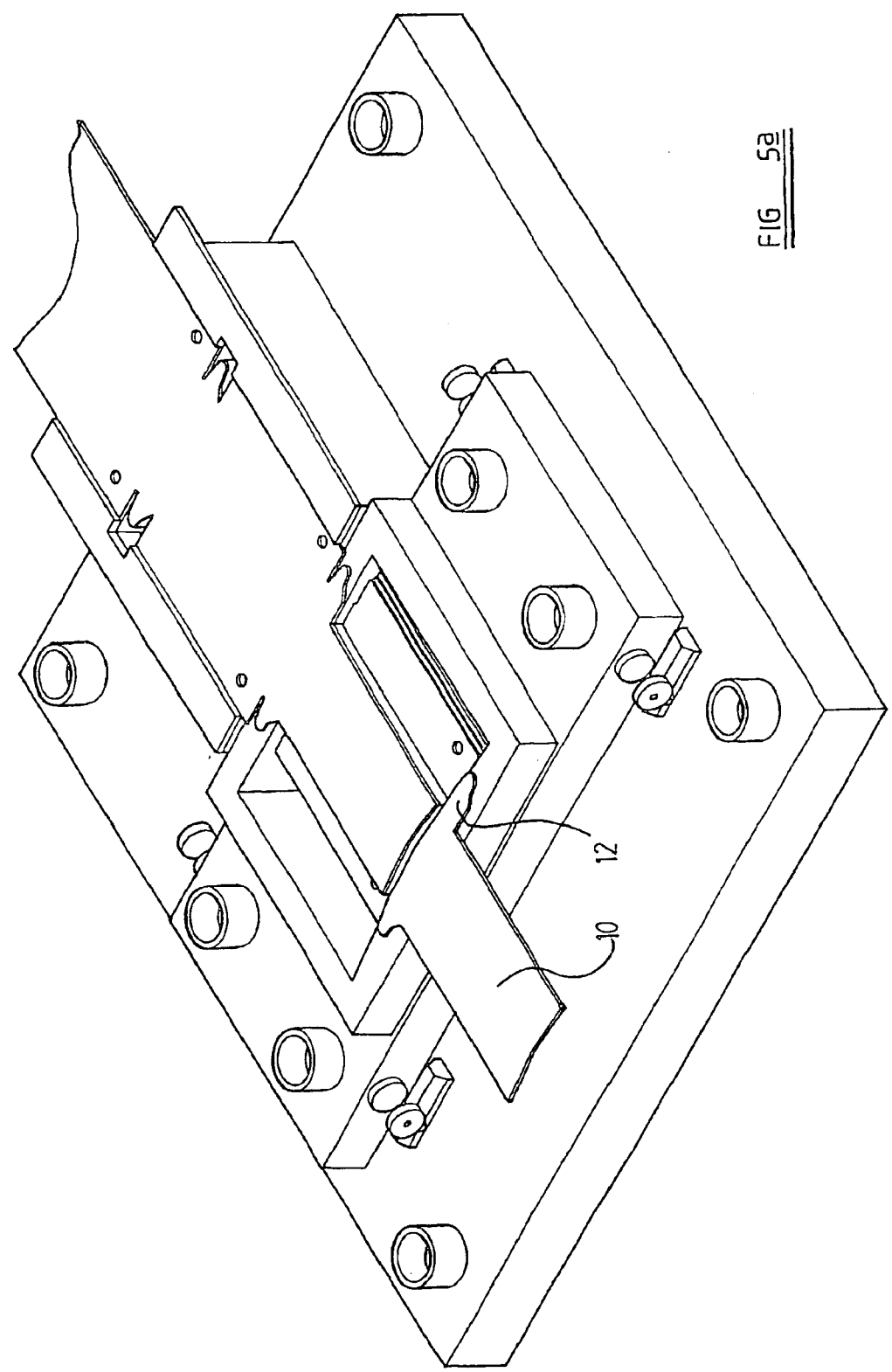

FIG. 1 shows a conventional rotor assembly comprising a shaft 6, and a plurality of rotor elements 8 connected to the shaft for rotation therewith about the axis A—A of the shaft 6, each rotor element comprising a body portion 10 and a pole portion 12. In conventional manner the rotor elements are typically 1 mm in thickness, and are stacked to a desired depth in the longitudinal direction, whilst the pole portions 12 are provided with curved outer surfaces 13, having a radius of curvature marginally smaller than the radius of curvature of the stator in which they are to be mounted, whereby a small air gap is provided between the rotor and the stator.

FIG. 2 illustrates schematically a modified construction of rotor, in which, whilst the body portions are retained in position, the pole portions 12 are progressively offset in both axial directions from a central plane B—B to produce a "chevron" appearance as can be seen in FIG. 2.

It will be apparent that in the arrangement shown in FIG. 2, the relative position of each pole portion differs in relation to an adjacent pole element, with respect of the centre line C/L of the body portion 10, and thus the rotor elements cannot conveniently be produced by the conventional stamping operation. Thus as shown in FIG. 3, which illustrates the variation in location of the pole portions 12 in relation to the body portions 8, it is conventional to manufacture the body portions and pole portions separately, and to secure these together, conveniently subsequent to assembly of the elements in a jig, by weld lines X disposed at two interfacial corners between the pole elements and the body elements.

FIG. 4a is a perspective view illustrating a die assembly, also illustrative of certain aspects of this invention, utilised for the performance of a method of producing rotor elements whereby a rotor assembly of the preferred "chevron" design may be manufactured more conveniently.

In accordance with this invention, the die assembly shown in FIG. 4a comprises a base plate 20 upon which a first, stationary member 22 is mounted, and adjacent thereto a second, moving die member 32.

The die member 22 comprises two die apertures 24a, 24b, each providing a die surface which corresponds to part of the periphery of the pole portion of a rotor element.

The moving die member 32 comprises die apertures 34a, 34b each providing a die surface corresponding to one side of a body portion 10, and a third die aperture 35 extending between the two die apertures 34a and 34b.

The die assembly also comprises means 36, comprising driven gear wheels 38 engageable with racks 40, whereby the die member 32 may be moved incrementally back and forth across the base plate 20.

The die assembly comprises means (not shown) for advancing strip steel 50, conventionally of 1 mm thickness, across the die assembly in the operation of the machine, guide means conveniently afforded by pegs 52 engageable within pre-formed apertures 54 in the steel strip being provided accurately to locate the strip 50 in relation to the stationary die member 22 and the moving die member 32.

The operation of the die assembly will now be described.

Punches (not shown) complimentary to the first die apertures 24a and 24b will remove portions of material from the steel strip corresponding to the outermost margins of the pole elements of a conventional rotor element.

Figure 8A:
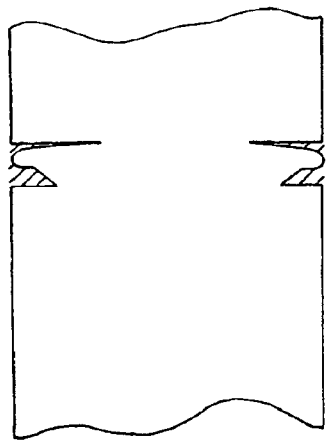
FIG. 8a and 8b are views illustrating the sequential stages in the punching of a rotor element in accordance with this invention, from steel strip material.
Figure 8B:
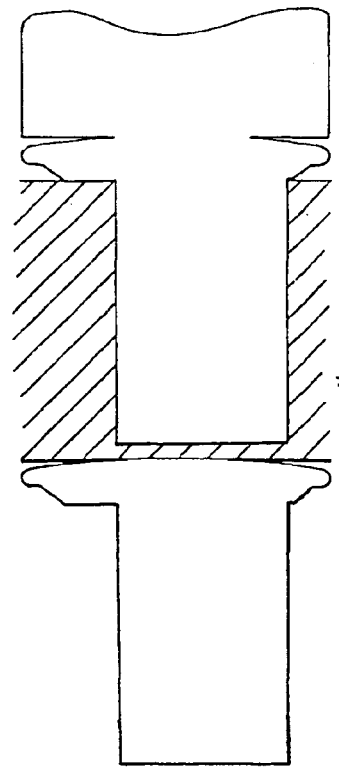

The strip is advanced from position B to position C (see also FIG. 8), and a punch member 62 comprising punch portions 64a, and 64b, corresponding to the apertures 34a and 34b respectively, are operated to punch outside the margins of the strip, whilst a third punch member 65, integral with the punch portions 64a and 64b, passes into the bridging aperture 35.

The punch members 64a and 64b co-operate with the areas of the strip removed by the punches of the first die assembly, and there is thus produced a completed rotor element 72, at position D.

Figure 7:
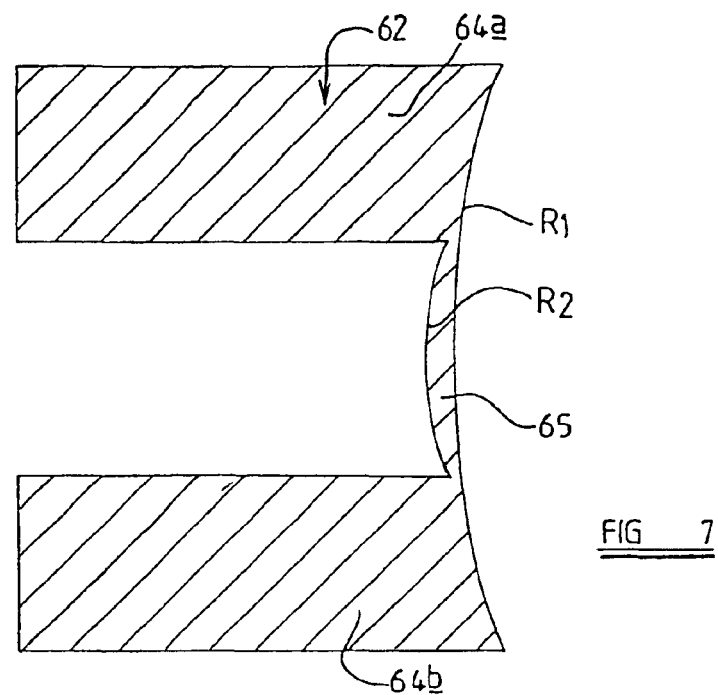
FIG. 7 is a plan view of a second die member of the machine.

As appears in FIG. 7, the bridging aperture 35 and corresponding punch portion 65 have surfaces provided with radii of curvature R1 and R2, the radius R1 being equal to the desired radius of curvature of the outer surfaces of the pole elements, whilst the radius R2 is equal to the radius of the bottom surface of the rotor.

It will of course be understood that the punches of both die assemblies are operated simultaneously. Subsequent to each punching operation, the drive means 36 is operated to cause an incremental movement of the die plate 32 in a desired direction, to produce an offset of the pole portion from the centre line C/L of the body portion, such movement incrementally moving to a maximum in one direction, and returning in the opposite direction to a start position. In this way the rotor elements which are produced by operation of the machine shown in FIG. 4 will be "stacked" in the correct sequence.

However, if desired, a plurality of rotor elements may be produced with the second die assembly in one location, prior to an incremental movement, and the punching of a plurality of rotor elements in this offset position.

Figure 6A:
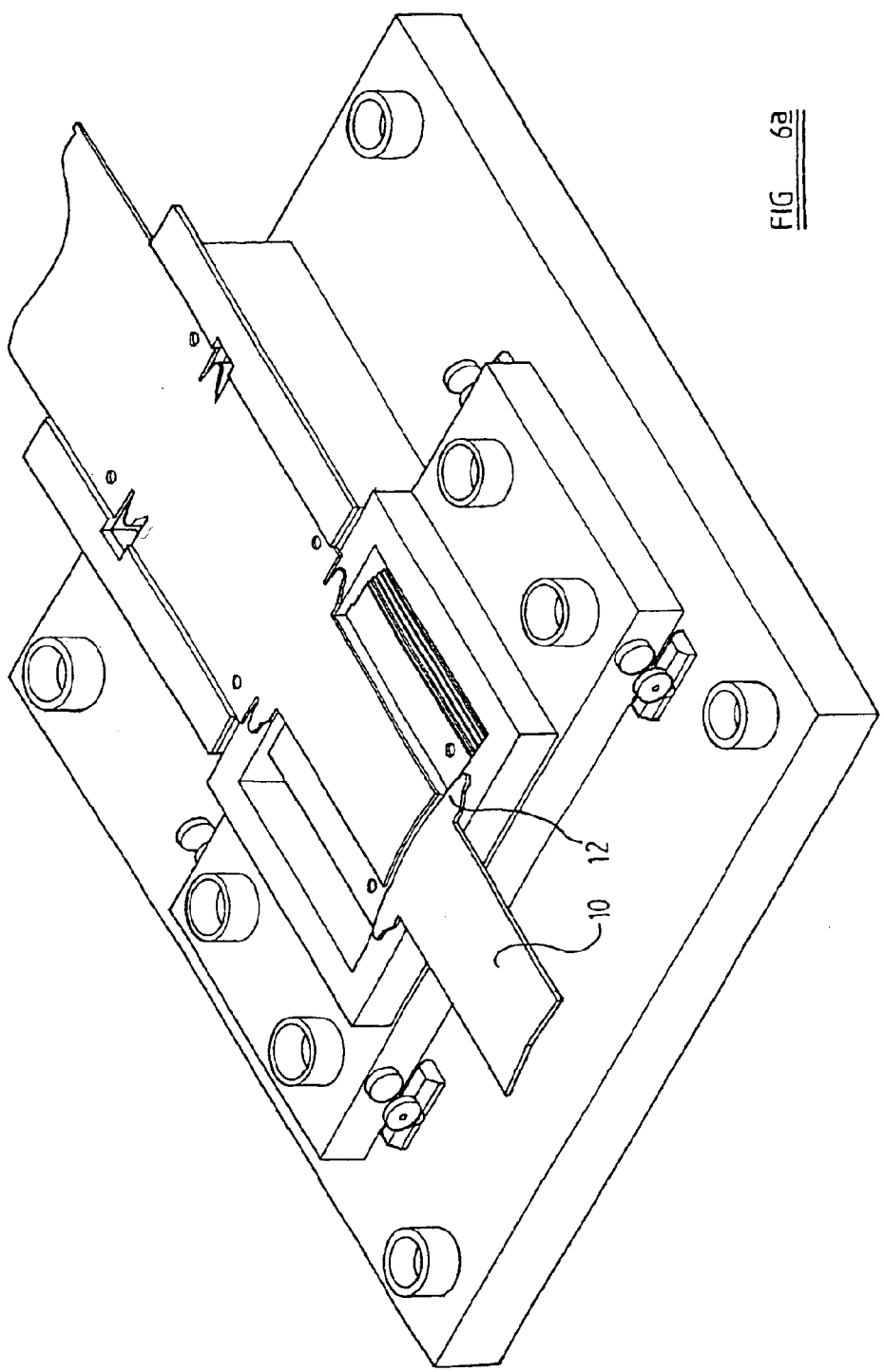
Figure 4B:
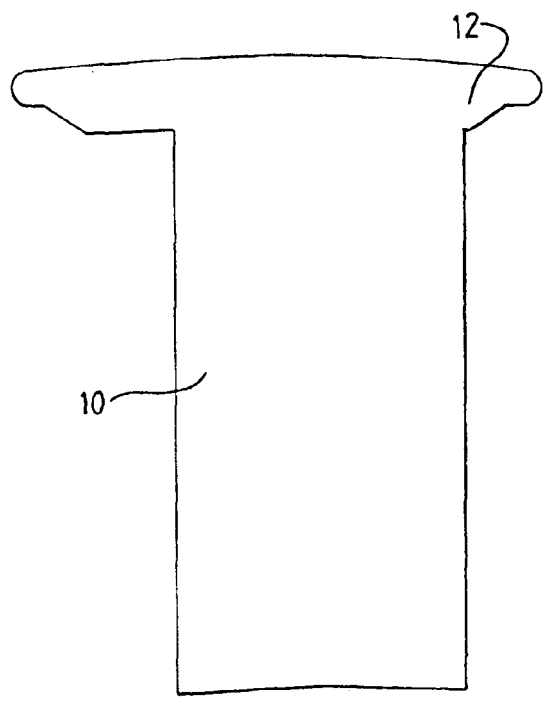
Figure 6B:
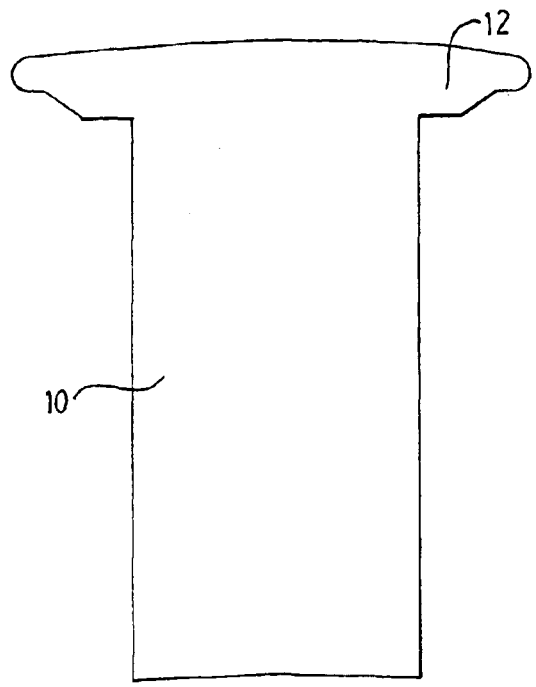
Figure 5B:
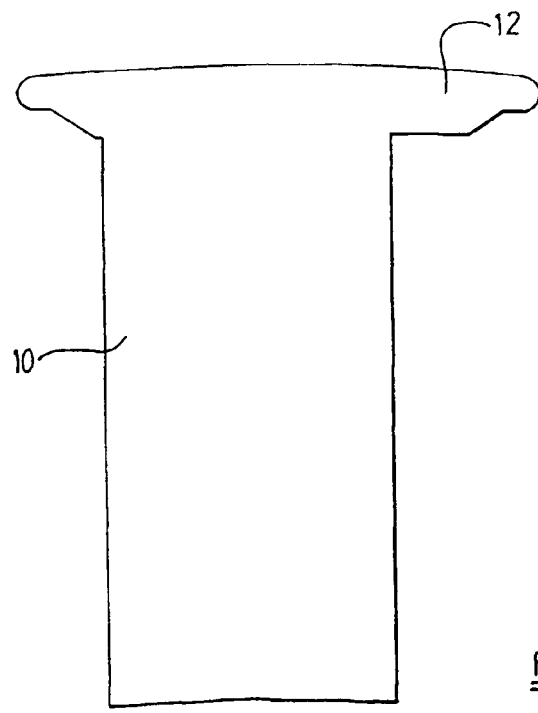

Whilst FIG. 4a shows the second and third die assemblies having been moved to a maximum position in one direction, FIG. 5a shows the second die assembly having been moved to a position of maximum offset in the opposite direction, whilst FIG. 6a shows the second die assembly in a medium position, the rotor elements produced by the die assembly in these rotor positions being illustrated in FIGS. 4b, 5b and 6b respectively.

Since the punch element 65 which produces the curved outer surface of the pole element, together with the curved inner surface of the body portion, is produced by the third die assembly, specifically by the punch 65 moving into the die apertures 35, the centre line of the radius of curvature of the pole portions will necessarily remain generally on the centre line C/L of the body portion (see particularly FIG. 7), although the offset of the pole portion will be different by one increment from the theoretical position. In this manner, although the pole elements will be staggered when the rotor elements are correctly secured together, the centre line of the outer surface will remain constant, and the air gap between the outer surface and the inner surface of the stator will remain constant, despite the fact that a "chevron" arrangement of pole elements is being utilised.

In this way the advantages of the chevron arrangement may be utilised, without the disadvantages of variation of the thickness of the air gap in the direction axially of the rotor assembly.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A method of manufacture of rotor elements involving the use of a die assembly to successively punch from strip material rotor elements having a pole portion and a body portion, part at least of the pole portion of the rotor element being produced by a first die member and part at least of the body portion being produced by a second die member, characterized by the steps of effecting relative movement between the first and second die members between successive punching operations to change the position of the entire body portion relative to the pole portion between successively manufactured rotor elements.

2. A method according to claim 1 wherein the said part of the pole portion which is produced by the first die member is that part of the pole portion which is common to all rotor elements.

3. A method according to claim 1 involving the use of a third die member adapted to punch the strip material along a line defining a remainder of the pole portion.

4. A method according to claim 3 wherein said third die member moves in the performance of the method with the second die member.

5. A method according to claim 3 wherein the third die members defines a curved outer surface of the pole portion.

6. A method of manufacture of rotor elements involving the use of a die assembly to successively punch from strip material a plurality of rotor elements each having a pole potion and a body portion, part at least of the pole portion of the rotor element being produced by a first die member and part at least of the body portion being produced by second die member, characterized by the steps of effecting relative movement between the first and second die members between successive punching operations, and wherein an incremental adjustment of the position of the second die member relative to the first die member is produced after each punching operation.

7. A machine for the manufacture of rotor elements comprising a die assembly comprising a first die member for the punching at least part of a pole portion of the rotor element from strip material, and a second die member for the punching of at least part of a body portion of the rotor element from the strip material, at least one of the first and second die members being mounted for movement relative to the other die member to produce rotor elements the pole portion of which may be offset by different distances from a center line of their associated body portions.

8. A machine according to claim 7 wherein each die member has associated therewith a punch, and preferably the assembly comprises a third die member adapted initially to produce a curved peripheral margin of the pole portions of the rotor elements.

9. A machine according to claim 8 wherein said third die member simultaneously produces the curved peripheral margin of the pole portion of the rotor elements and a curved peripheral margin of the body portions of the rotor elements.

10. A machine according to claim 7 wherein the second and third die members are integral.

11. A machine according to claim 7 comprising means to cause all the die members to perform a punching operation simultaneously.

12. A method of manufacturing elements from strip stock, the elements in use being stacked to provide an assembly of stacked elements for an electrical motor, each element including first and second portions which are integrally formed, the method including providing by punching at least parts of the first portions of each element using a first die member of a die assembly of a machine, providing by punching at least parts of the second portions of each element using a second die member of the die assembly, and wherein the method includes relatively moving the first and second die members between successive punching operations when the first and second portions of the elements are provided, whereby incremental adjustment of the position of the second die member relative to the first die member is effected so that the second portions of the successive elements are incrementally offset relatives to the second portions of the respective previous elements with respect to a center line of the first portion.

13. A method according to claim 12 herein the die assembly includes a third die member and the method includes providing by punching using the third die member, a peripheral margin between the first portion of an element and a second portion of an element made by a preceding punching operation.

14. A method according to claim 13 wherein the peripheral margin of the second portion is curved.

15. A method according to claim 13 wherein the third die member is moved with the second die member incrementally between successive punching operations.

16. A method according to claim 12 wherein the first die member is maintained stationary relative to a base of the machine, and the second die member is moved incrementally between successive punching operations relative to the first die member and the base.

17. A method according to claim 12 wherein the second and third die members are integral.

* * * * *